United States Patent [19]

Hamada

[11] Patent Number: 6,107,937
[45] Date of Patent: *Aug. 22, 2000

[54] REMOTE CONTROL SYSTEM AND METHOD

[75] Inventor: Tetsuya Hamada, Omiya, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/594,797

[22] Filed: Jan. 31, 1996

[30] Foreign Application Priority Data

Jan. 31, 1995 [JP] Japan .................................. 7-034253

[51] Int. Cl.$^7$ .................................................. G08C 19/00
[52] U.S. Cl. ............................. 340/825.69; 340/825.72; 359/142; 348/734; 341/176
[58] Field of Search ................ 340/825.72; 348/825.69, 348/734; 359/142, 145, 146, 148; 379/96, 102, 202, 205, 406

[56] References Cited

U.S. PATENT DOCUMENTS

| | | | |
|---|---|---|---|
| 4,471,425 | 9/1984 | Yamaguchi et al. | 364/200 |
| 4,728,948 | 3/1988 | Fields | 340/825.06 |
| 4,751,581 | 6/1988 | Ishiguro et al. | 358/194.1 |
| 4,764,981 | 8/1988 | Miyahara et al. | 455/603 |
| 4,930,011 | 5/1990 | Kiewit | 358/84 |
| 5,008,662 | 4/1991 | Tokizane et al. | 340/825.06 |
| 5,098,110 | 3/1992 | Yang | 273/438 |
| 5,175,731 | 12/1992 | Suarez | 370/856 |
| 5,204,768 | 4/1993 | Tsakiris et al. | 359/148 |
| 5,696,912 | 12/1997 | Bicevskis et al. | 395/308 |

*Primary Examiner*—Michael Horabik
*Assistant Examiner*—Anthony A. Asongwed
*Attorney, Agent, or Firm*—Fitzpatrick, Cella, Harper & Scinto

[57] ABSTRACT

Remote control system and method for preventing the mixing of signals from remote manipulation devices and consolidately operating controlled devices including the remote manipulation devices comprise controlled devices including a plurality of remote manipulation devices, an image input device, a monitor device and a record device, and a computer. The computer transmits a transmission permission signal for permitting the transmission of the remote manipulation device having an ID code through the controlled device, and the remote manipulation device having the coincident ID code responds to the reception of the transmission permission signal to transmit a control signal to the controlled device. The computer 107 interprets a control command from the control signal received through the controlled device and transmits the control command to the controlled device. The controlled device responds to the control command to execute it. Accordingly, the simultaneous transmission of control commands by more than one remote manipulation devices is avoided and the mixing of the signals is prevented.

28 Claims, 9 Drawing Sheets

REMOTE CONTROL SYSTEM AND METHOD

BACKGROUND OF THE INVENTION

1. Field of the Invention

The present invention relates to a remote control system and method.

2. Related Background Art

A television conference system has been known as a remote control system of this type. FIG. 9 shows a block diagram of a prior art television conference system. In FIG. 9, numerals 601, 602, 603 and 604 denote dedicated remote manipulation units (remote operation device). Numeral 605 denotes an image input apparatus, numeral 606 denotes a monitor unit, numeral 607 denotes a record unit (VTR) and numeral 608 denotes a communication system, all of which are controlled units which are controlled by a personal computer 609. Solid line arrows indicate signal lines connected from the computer 609 to the respective controlled units and broken line arrows indicate flows of signal sent from the remote manipulation units 601, 602, 603 and 604 to the respective controlled units.

In the prior art remote control system, an operator may use the personal computer 609 to consolidately manipulate the power-on/off of the controlled units such as the image input unit 605, the monitor unit 606, the VTR unit 607 and the communication system 608 and the data communication. The operator may also use the dedicated remote manipulation units 601, 602, 603 and 604 so that he may control the controlled units even if he is remote from the personal computer 609 so long as he is within an effective range of the remote control.

However, the prior art television conference system which utilizes the personal computer 609 and the remote manipulation units 601, 602, 603 and 604 has the following problems which are to be solved. Namely, when a plurality of the remote manipulation units 601, 602, 603 and 604 are used within the effective range, control signals simultaneously sent from the remote manipulation units 601, 602, 603 and 604 may be mixed so that the operator cannot attain the desired control or the manipulation may be impeded by other operator during the manipulation.

Further, when the controlled units are manipulated by using the remote manipulation units 601, 602, 603 and 604, the manipulation conditions of the controlled units which are managed by the personal computer 609 may inadvertently be changed so that they may not conform to the instruction from the personal computer 609.

Further, when the controlled units are manipulated by using the remote manipulation units 601, 602, 603 and 604 and the manipulation is not accepted because the controlled unit is in the process of manipulation but the operator does not notice it, a mismanipulation may take place.

SUMMARY OF THE INVENTION

It is an object of the present invention to solve one or more of the above problems.

It is another object of the present invention to provide a remote control system and method which prevent) the mixing of signals from the remote manipulation units and can consolidately manipulate the controlled units including the remote manipulation units.

In order to achieve the above objects, the present invention provides a remote control system for controlling a controlled unit connected to a main control unit by a remote manipulation unit. The remote manipulation unit includes transmission permission signal receiving means for receiving a transmission permission signal from the main control unit and control signal transmission means for transmitting a control signal in accordance with the received transmission permission signal. The main control unit includes transmission permission signal transmitting means for transmitting the transmission permission signal to the remote manipulation unit, operation status managing means for managing an operation status of the controlled unit and control means for controlling the controlled unit in accordance with the managed operation status and the control signal.

It is other object of the present invention to provide a remote control system which improves the operability.

It is other object of the present invention to provide a remote control system which is suitable for the television conference system.

It is other object of the present invention to control television conference terminal common to a plurality of participants.

Other objects and features of the present invention will be apparent from the following detailed description of the preferred embodiments and the drawings.

DETAILED DESCRIPTION OF THE PREFERRED EMBODIMENTS

Figure 1:
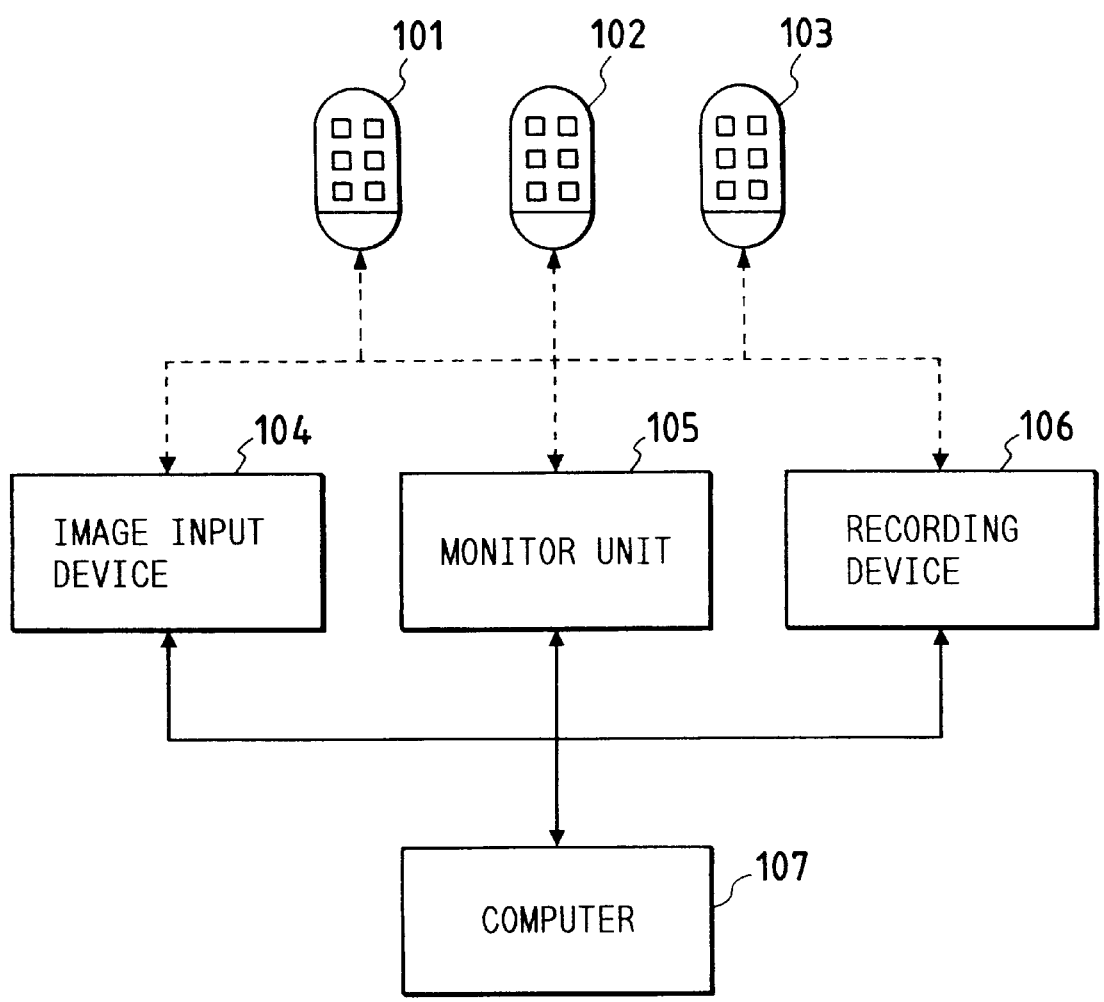
FIG. 1 shows a block diagram of an overall configuration of a remote control system.

Referring to the drawings, embodiments of the remote control system and method of the present invention are explained.

[First Embodiment]

FIG. 1 shows a block diagram of an overall configuration of a remote control system. In FIG. 1, numerals 101, 102 and 103 denote remote manipulation units. The remote manipulation unit 101 controls an image input unit 104 for picking up an image of an object such as an operator. The remote manipulation unit 102 controls a monitor unit 105 for displaying a video image derived from the image input unit 104. The remote manipulation unit 103 controls a record unit 106 for recording and reproducing video information. The image input unit 104, the monitor unit 105 and the record unit 106 are controlled units controlled by the remote manipulation units 101, 102 and 103 or a computer 107. The computer 107 manages the image input unit 104, the monitor unit 105 and the record unit 106 and processes and communicates data in addition to the control.

Figure 2:
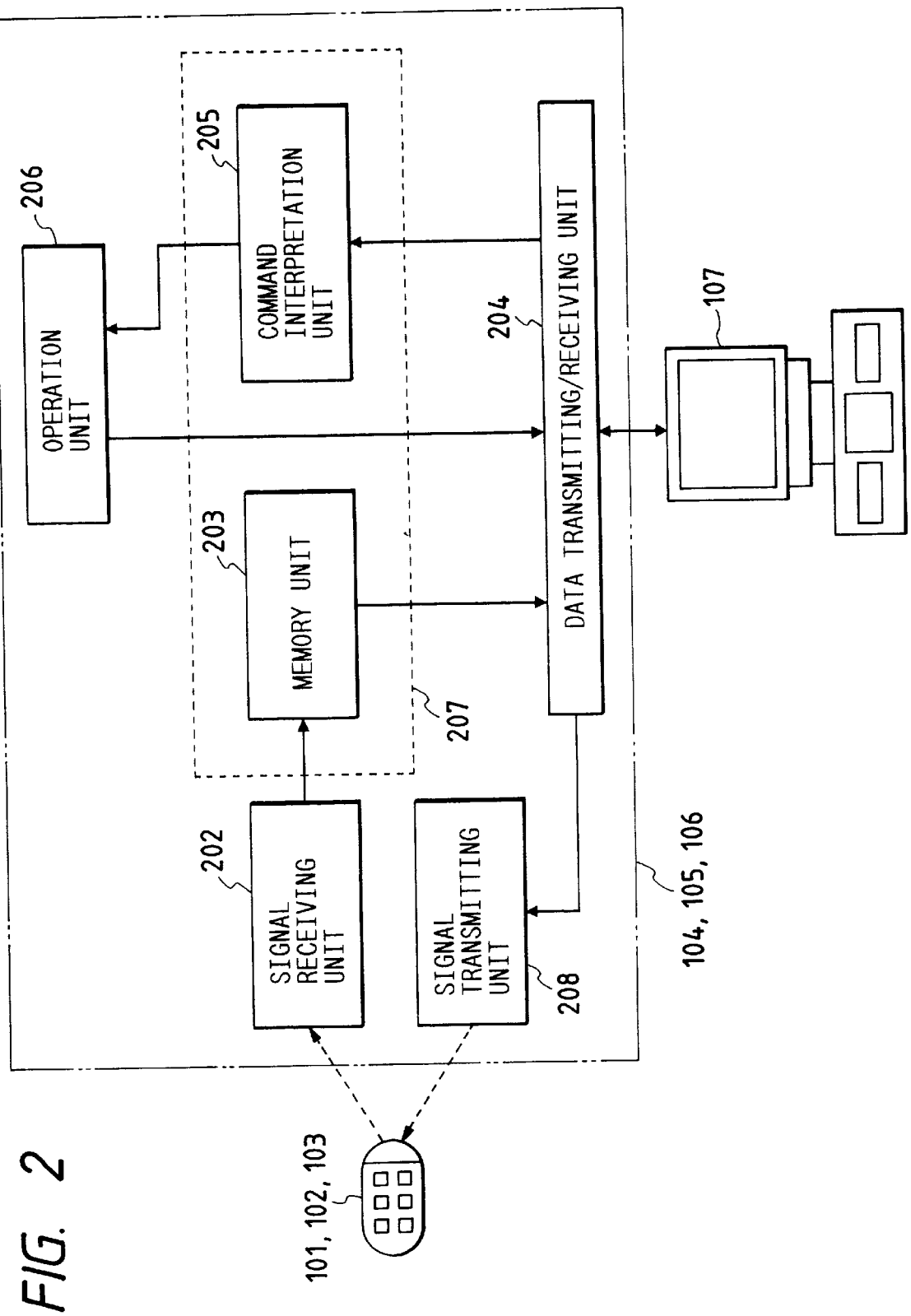
FIG. 2 shows a block diagram of a configuration of a controlled unit.

FIG. 2 shows a block diagram of a configuration of the controlled unit. In FIG. 2, numeral 202 denotes a signal receiver for receiving control signals from the remote manipulation units 101, 102 and 103, numeral 203 denotes a memory built in a control microcomputer 207, numeral 204 denotes a data transmission/reception unit for communicating with the computer 107 which controls the overall remote control system, numeral 205 denotes a command interpretation unit for interpreting a command sent from the computer 107 and numeral 206 denotes an execution unit (operation unit) for executing the command interpreted by the command decoder 205. Numeral 207 denotes the control microcomputer having the memory 203 and the command decoder 205 for controlling the signal receiver 202, the data transmission/reception unit 204, the execution unit 206 and a signal transmission unit 208. Numeral 208 denotes the signal transmission unit for transmitting a transmission permission signal sent from the computer 107 to the remote manipulation units 101, 102 and 103.

Figure 3:
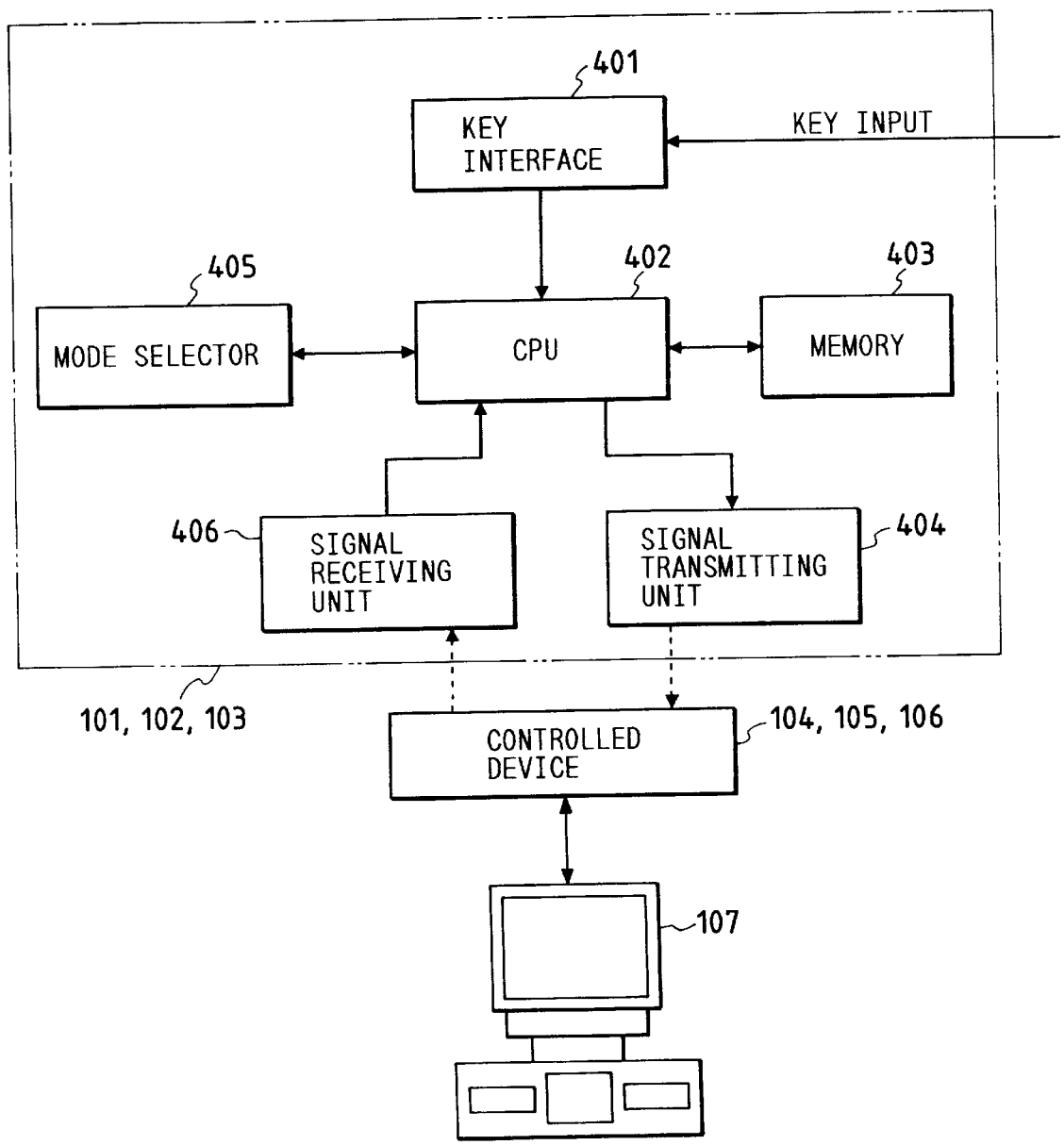
FIG. 3 shows a block diagram of a configuration of a remote manipulation unit.

FIG. 3 shows a block diagram of a configuration of each of the remote manipulation units 101, 102 and 103. The units 101, 102 and 103 are of the identical configuration. In FIG. 3, numeral 401 denotes a key interface built in the remote manipulation unit 101, 102 or 103, numeral 402 denotes a CPU for controlling the remote manipulation units 101, 102 and 103, numeral 403 denotes a memory for storing information, numeral 404 denotes a signal transmission unit for transmitting a control signal from the remote manipulation unit 101, 102 or 103, numeral 405 denotes a mode selector for selecting a mode upon inputting an ID code to be described later and numeral 406 denotes a signal receiver for receiving a transmission permission signal by the computer 107 sent from the controlled unit. Each of the remote manipulation units 101, 102 and 103 adds a control signal to the ID code and transmits it from the signal transmission unit 404. The control signal sent from the signal transmission unit 404 is an infrared signal.

In the remote control system of the above configuration, an operator uses the computer 107 to control a direction and a zoom position of the image input unit 104 (for example, a camera) to attain a desired image while he watches the monitor unit 105. When it is desired to record the image information in parallel with the display of the image on the monitor unit 105, the operator manipulates the record unit 106 to record the information. A control command sent from the computer 107 is supplied to the command decoder 205 through the data transmission/reception unit 204 of the controlled unit. The control command is interpreted by the command decoder 205 built in the microcomputer 207 and the interpreted command is executed by the execution unit 206. After the execution by the execution unit 206, the microcomputer 207 returns a value to the computer 107 through the data transmission reception unit 204.

When the operator uses a plurality of remote manipulation units, he sets different ID codes to the respective remote manipulation units 101, 102 and 103. In order to set the ID codes, the mode selector 405 is manually switched to the ID code input mode and the ID codes are manually entered through the key interface 401. When the entered ID codes are stored in the memory 403, the ID code input mode is reset. When the CPU 402 sends the control signal, the ID code stored in the memory 403 is read. The CPU 402 adds the read ID code to the control signal and sends it to the controlled unit from the signal transmission unit 404.

An operation of the remote manipulation system of the above configuration is explained.

Figure 4:
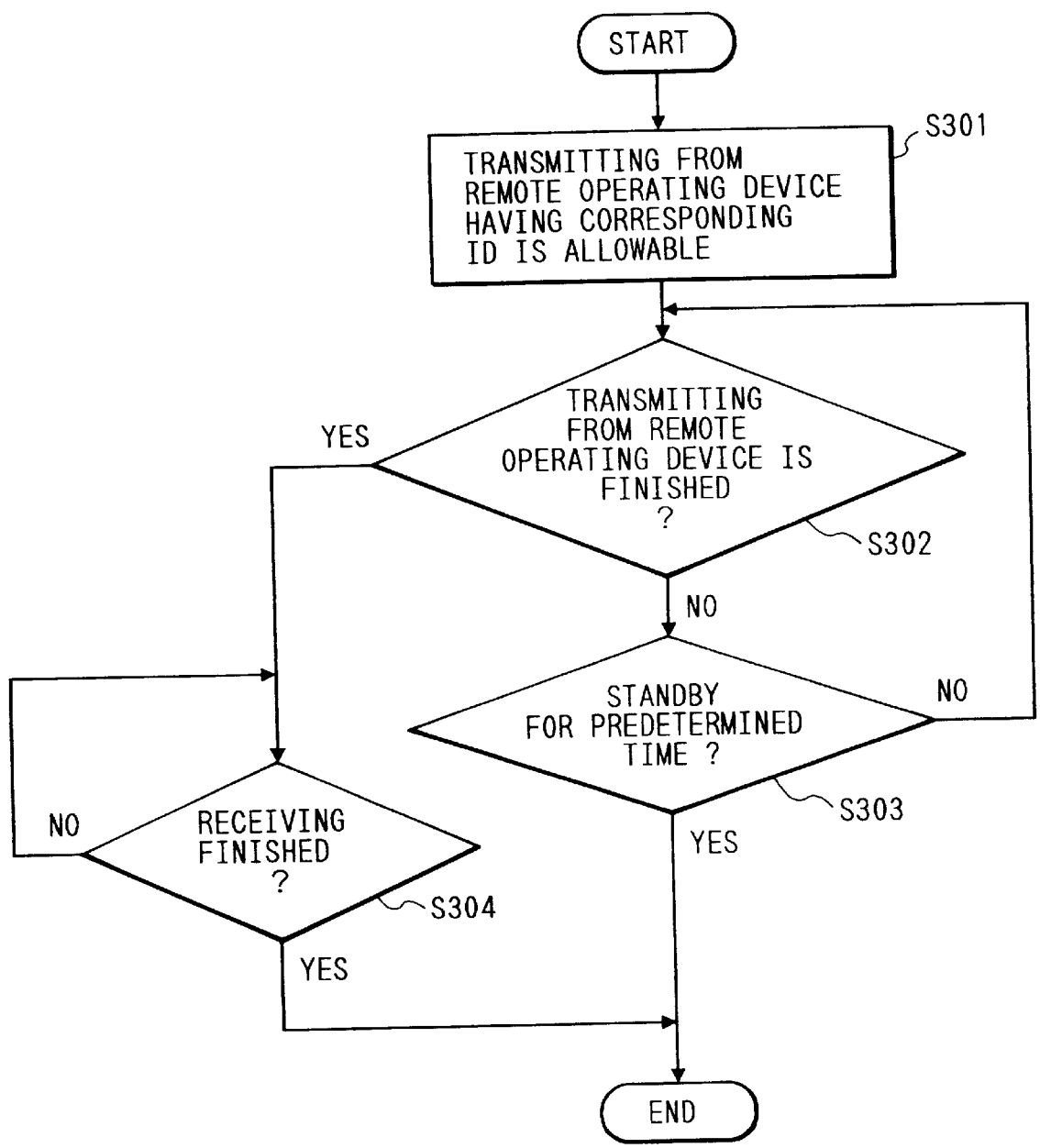
FIG. 4 shows a flow chart of a sending routine of a transmission permission signal executed by a computer.

FIG. 4 shows a flow chart of a transmission routine of the transmission permission signal which is executed by the computer 107. The computer 107 continuously transmits the transmission permission signal for permitting the transmission to only the remote manipulation unit having a specific ID code from the signal transmission unit 208 at a preset time interval (step S301) in order to prevent the simultaneous transmission of the control signals by the remote manipulation units 101, 102 and 103. During this period, whether the control signal has been sent from the remote manipulation unit having the designated ID code or not is determined (step S302).

If the remote manipulation unit has not sent the control signal, the reception of the control signal from the remote manipulation unit is monitored for a predetermined time interval (step S303), and if the control signal is not received within the predetermined time interval, the present routine is terminated. In this case, the process shown in the flow chart of FIG. 4 for executing a similar flow to permit the transmission of the control signal to the remote manipulation unit having other ID code is repeated. The operator may set any desired monitor period. When the transmission of the control signal from the remote manipulation unit is detected, the next step is not executed until the reception of the control signal is completed (step S304). Accordingly, the transmission of the next transmission permission signal is inhibited (step S304).

The remote manipulation units 101, 102 and 103 are now explained. In the units 101, 102 and 103, when a control signal is to be sent, the transmission permission signal sent from the computer 107 is first received by the signal receiver 406. The CPU 402 in the remote manipulation unit 101, 102 or 103 determines whether the transmission of the control signal is permitted or not. If the determination indicates that the ID code of its own stored in the memory 403 coincides with the ID code contained in the transmission permission signal and the transmission is permitted, the transmission of the control signal is instantly started through the signal transmission unit 404. On the other hand, if the transmission is not permitted, the CPU 402 temporarily stores the control signal in the memory 403 and upon the permission, it sends the control signal through the signal transmission unit 404.

In this manner, the computer 107 controls the transmission timing of the remote manipulation unit based on the ID code to prevent the simultaneous transmission of the control signals by more than one remote manipulation units and a chance of the reception error due to the mixing of the control signals is reduced.

The control signal sent from the remote manipulation unit is received by the signal receiver 202 of the controlled unit. The received control signal is stored in the memory 203 built in the microcomputer 207 and sent to the computer 107 through the data transmission/reception unit 204.

Figure 5:
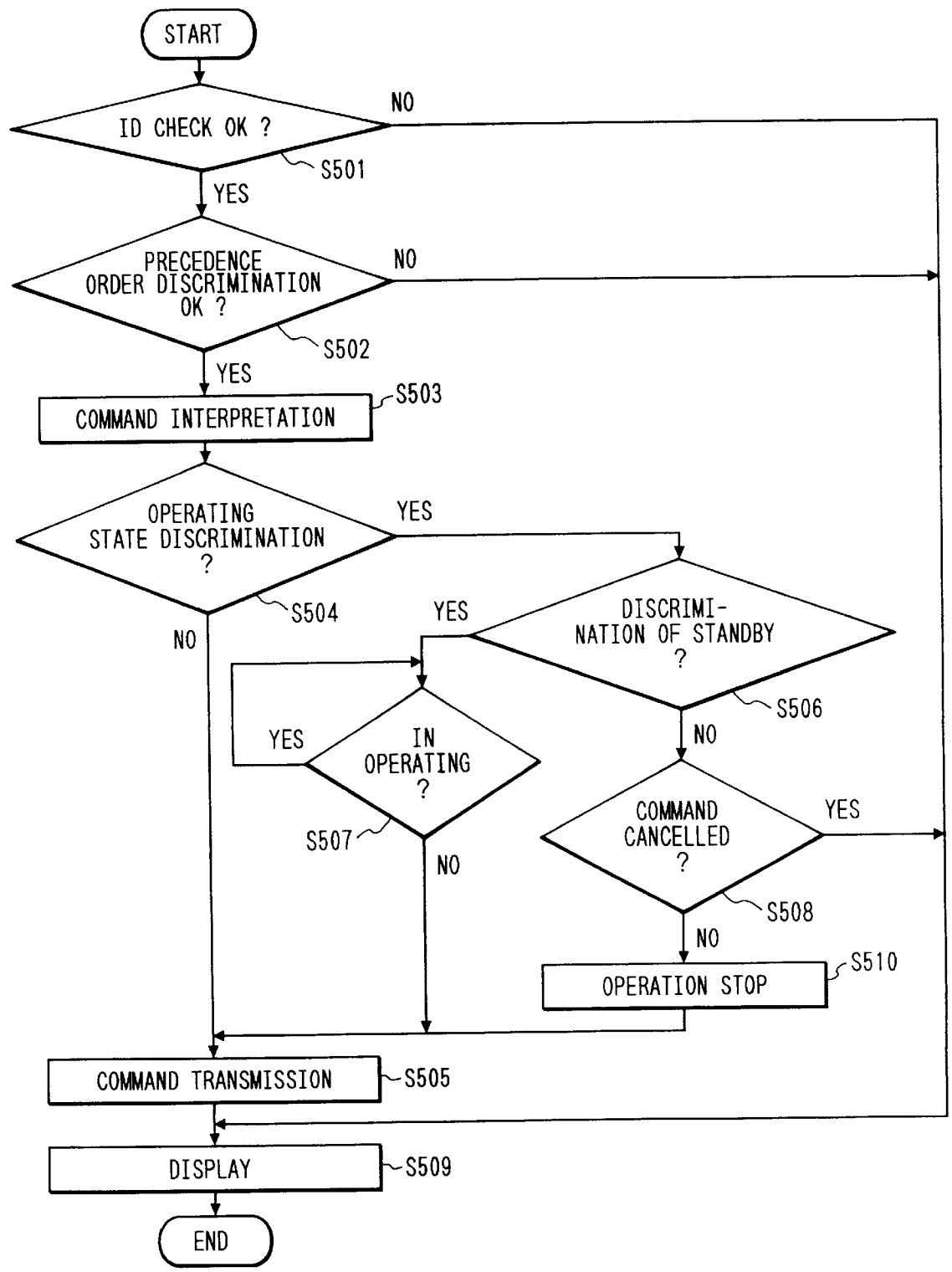
FIG. 5 shows a flow chart of a remote control process routine executed by the computer.

FIG. 5 shows a flow chart of a process routine for responding to the remote manipulation executed by the computer 107. The computer 107 first determines the ID code contained in the control signal from the remote manipulation unit 101, 102 or 103 and determines whether it accepts the control signal from the remote manipulation unit having the identified ID (step S501).

If it is determined not to accept, the non-acceptance of the control signal is displayed on the display of the computer 107. If the control signal is accepted, the priority of the ID code of the unit which sent the control signal is determined (step S502). Namely, if the computer has already been operating by the control signal from other unit, the priority thereof is compared with that of the unit which newly accepts the control signal. The control signal from the remote manipulation unit having a higher priority is accepted and the control signal from the lower priority remote manipulation unit is not accepted, and the present routine is terminated.

The control signal sent from the accepted remote manipulation unit is received and the control command is interpreted from the received control signal (step S503). Depending on the control command, the controlled unit is under operation and cannot receive a new command, or the control by the remote manipulation unit may be inhibited. Accordingly, it is necessary to determine whether the controlled unit can execute the control signal or not and the computer 107 determines the current operation status of the computer 107 (step S504).

When it is determined that the controlled unit is not operating, the control command is sent to that controlled unit (step S505). The controlled unit operates in accordance with the received control command. The content of the executed control command is displayed on the display of the computer 107 so that the operator may confirm the content of the operation of the controlled unit.

On the other hand, if the controlled unit is operating in the step S504, whether the execution of a new control command is to be monitored or not is determined (step S506). The determination is made by comparing the priority of the command under execution and the priority of the new control command. When it is decided to monitor, the completion of the control command being executed is monitored (step S507). The transmission of the new control command is suspended until the completion of the control command being executed or for a predetermined time period, and when the transmission is permitted, the control command is sent to the controlled unit (step S505) and the result is displayed on the display (step S509). Namely, one or both of the permission of the transmission and the content of the received control command are displayed. Alternatively, only the input of the new control command may be displayed.

If the execution without monitoring is selected in the step S506, it is determined whether the new control command is to be instantly executed or the new command is to be discarded (step S508). When the new control command is discarded, the control command to be executed and the reason for the discard are displayed on the display of the computer 107 (step S509) and the present routine is terminated. The operator may check the present operation status by watching the display.

If the new control command is not discarded in the step S508 and the controlled unit is operating by other control command when the new control command is to be executed, the operation is stopped (step S510). Namely, it is displayed on the display (step S509) that the operation being executed is stopped and the new control command is executed (step S505), and the present routine is terminated.

The priority is preset in the computer 107 so that the control signal of a higher priority may be preferentially executed. When the control command being executed is canceled in the step S509 or the control signal is not accepted, the non-acceptance of the control signal is displayed.

In this manner, in the remote control system of the present embodiment, the computer 107 provides the ID codes for the remote manipulation units and the control signal of the remote manipulation unit which is not permitted is disregarded even if more than one remote manipulation units are simultaneously used within the effective range of the remote manipulation units so that the confusion by the use of more than one remote manipulation units is avoided.

Further, since the control signal of the remote manipulation unit is sent in synchronism with the transmission permission signal of the computer 107, the occurrence of the transmission error by the mixing of the control signals is reduced. Further, when the control signal is sent to the computer 107, the computer determines whether it executes the control command in accordance with the received control signal or not. Thus, the discrepancy in the control is less likely to occur compared with a case where the remote manipulation units are independently used and the misoperation by the operator is prevented.

While the infrared ray is used in the remote manipulation units of the present embodiment, other communication means such as a radio electrical signal may be used. The computer 107 may be a work station or a dedicated terminal.

[Second Embodiment]

Remote control system and method of a second embodiment are now explained. An overall configuration of the remote control system of the present embodiment is identical to that of the first embodiment. In the remote control system of the first embodiment, the new control signal inputted through the key interface 401 when the remote manipulation unit sends the control signal is temporarily stored in the memory 403 by the CPU 402. Accordingly, the new control signal may be ready to be transmitted subsequently but the control signal transmitted by the remote manipulation unit may change by the presence of an obstacle after the reception of transmission permission signal of the computer 107. In the second embodiment, a reception error is detected to cope with such a case.

Figure 6:
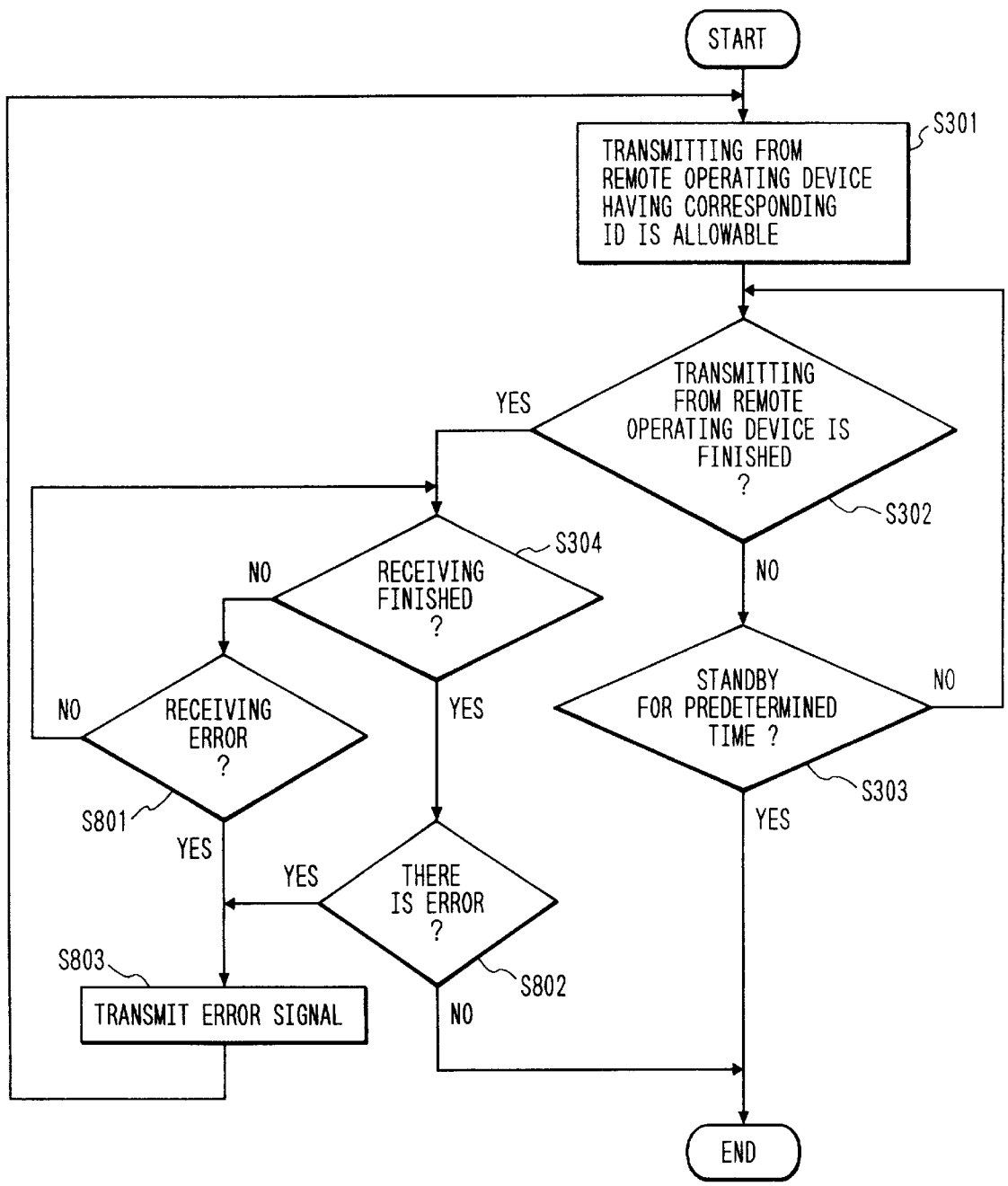
FIG. 6 shows a flow chart of a sending routine of the transmission permission signal in a second embodiment.

FIG. 6 shows a flow chart of a transmission routine of the transmission permission signal in the second embodiment. Since the steps S301 to S304 are identical to those of the first embodiment, the explanation thereof is omitted. In the step S304, the computer 107 determines whether the reception of the control signal from the remote manipulation unit is completed or not, and if the reception is not completed, whether the reception error has occurred or not is determined (step S801). If the reception error has not occurred, the reception is continued, and if the reception error has occurred, an error signal of the error code is sent to the remote manipulation unit (step S803) and the routine returns to the step S301 to conduct the reception of the control signal from the remote manipulation unit having the same ID code.

The error signal is received through the signal receiver 406 and interpreted by the CPU 402. Since the transmission error has occurred, the CPU 402 reads the control signal stored in the memory 403 and sends the control signal through the signal transmission unit 404.

When the reception is completed in the step S304, whether an error has occurred in the received control signal or not is determined (step S802). If the error has occurred, the error signal is sent to the remote manipulation unit (step S803), and if the error has not occurred, the present routine is terminated.

In this manner, in the remote control system of the present embodiment, even if the error occurs during the transmission/reception, the same control signal is retransmitted so that the operability of the remote manipulation unit is enhanced.

[Third Embodiment]

Figure 7:
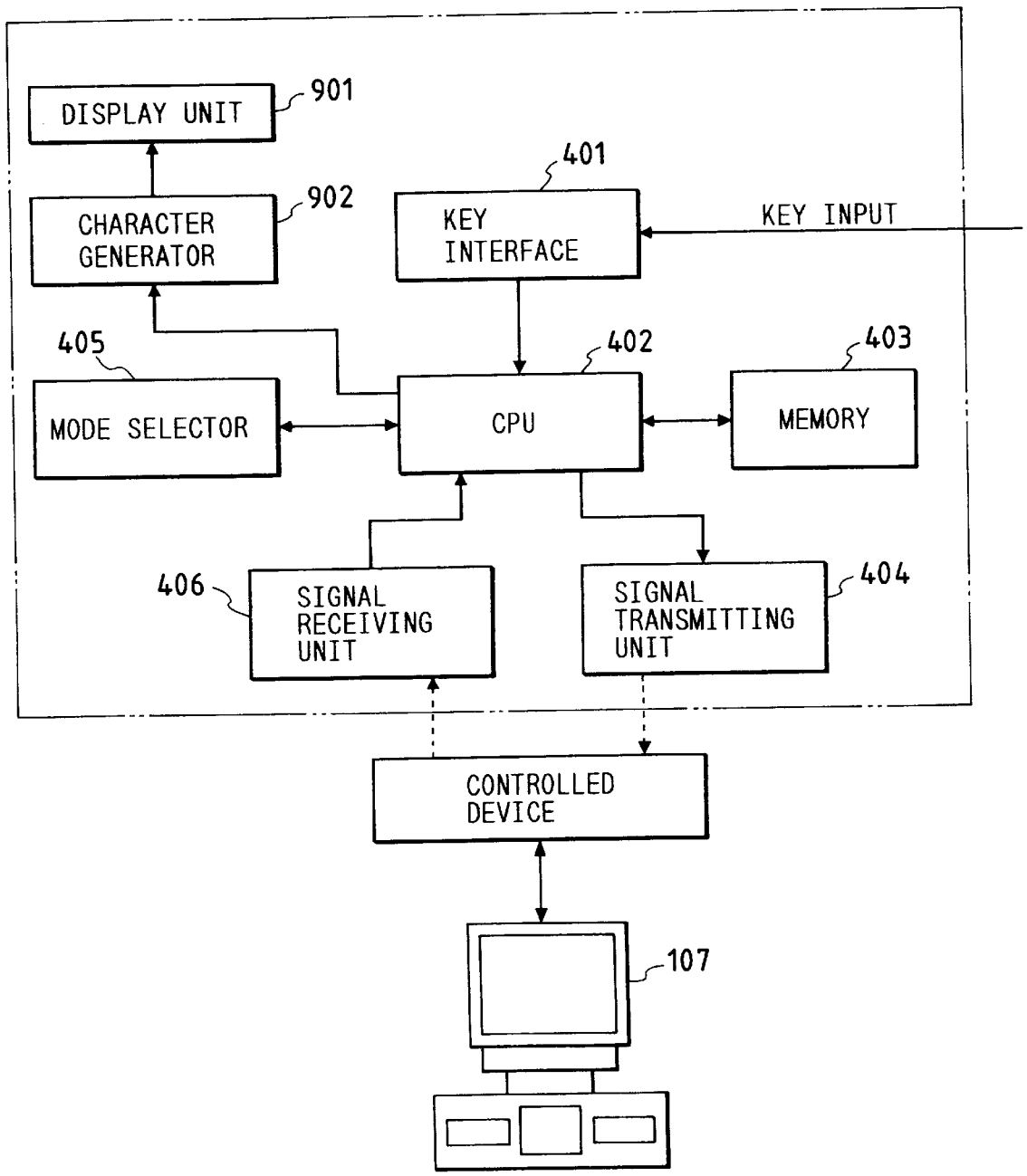
FIG. 7 shows a block diagram of a configuration of a remote manipulation unit in a third embodiment.

Remote control system and method of a third embodiment are now explained. FIG. 7 shows a block diagram of a configuration of the remote manipulation unit of the third embodiment. In FIG. 7, numeral 901 denotes a display unit for displaying information to the operator of the remote manipulation unit and numeral 902 denotes a character generator for displaying a character on the display unit 901. The like elements to those of the first embodiment are designated by the like numerals.

Before the transmission of the control signal, the remote manipulation unit receives the transmission permission signal sent from the computer 107 by the signal receiver 406, and the CPU 402 determines whether the transmission of the control signal is permitted or not. If the ID code of its own stored in the memory 403 coincides with the transmitted ID code and the transmission is permitted, the control signal is sent through the signal transmission unit 404. On the other hand, if the transmission is not permitted, the CPU 402 temporarily stores the control signal in the memory 403 and waits until the transmitted ID code coincides to permit the transmission, and when the transmission is permitted, it sends the control signal through the signal transmission unit 404.

The transmitted control signal is sent to the computer 107 through the controlled unit. When the computer 107 receives the control signal, it sends the operation status of the controlled unit, the zoom position information of the image input unit and the position information of a pan head to the operator of the remote manipulation unit. The controlled unit operates in accordance with the transmitted control signal. The transmitted signal is sent from the signal receiver 406 to the CPU 402. The CPU 402 interprets the received information and displays it on the display unit 901 by the character generator 902 to inform the current status to the operator of the remote manipulation unit. The display unit 901 may be a liquid crystal display.

In the prior art, the remote manipulation unit merely sends the control signal and it is difficult to determine whether it is actually accepted or not or recognize the current status. In the present embodiment, the information from the computer 107 is displayed on the display unit of the remote manipulation unit so that the operator of the remote manipulation unit may grasp the status and perform more proper control.

[Fourth Embodiment]

Figure 8:
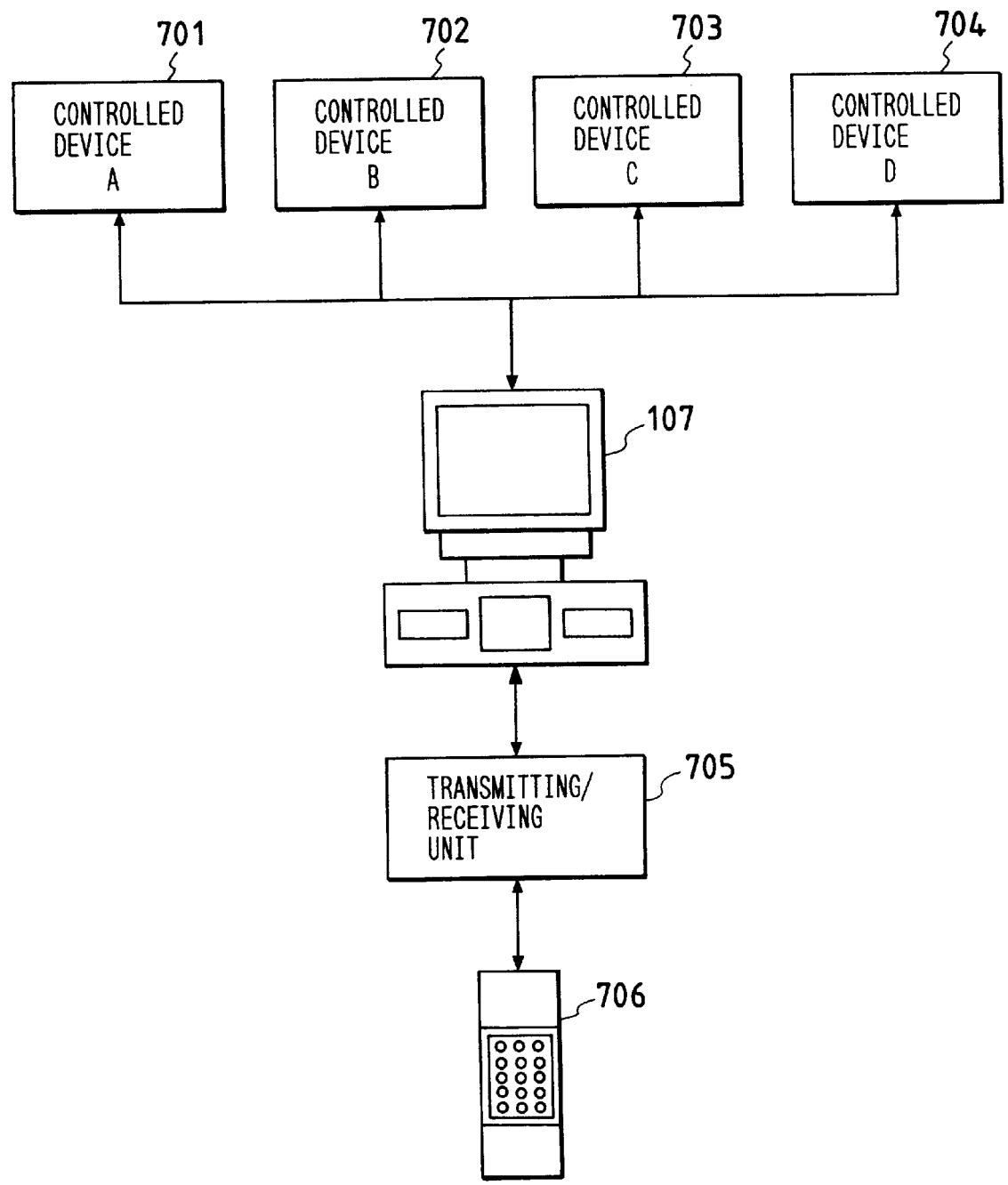
FIG. 8 shows an overall configuration of a remote control system in a fourth embodiment.
Figure 9:
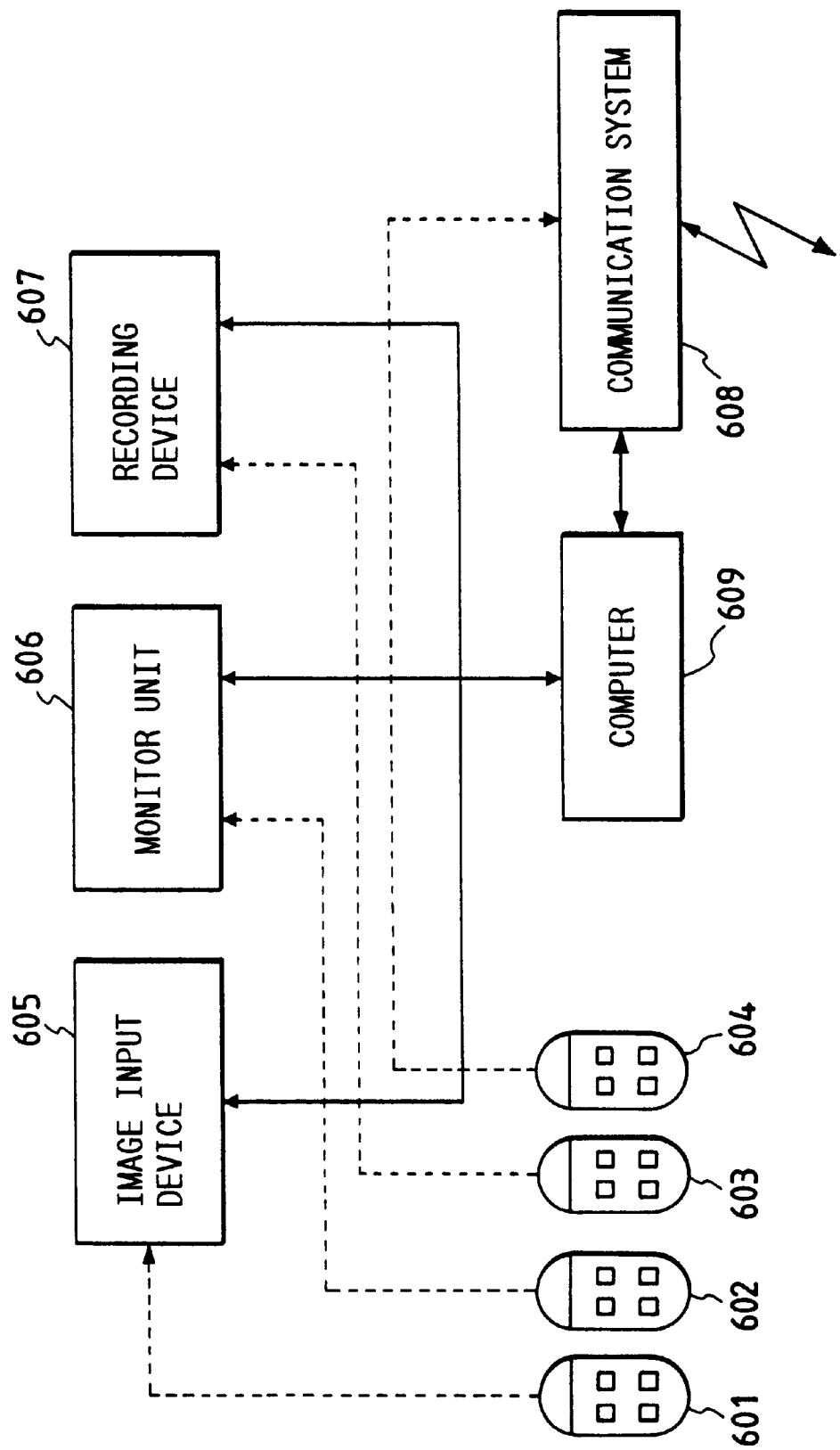
FIG. 9 shows a block diagram of a prior art television conference system.

Remote control system and method of a fourth embodiment are now explained. FIG. 8 shows an overall configuration of the remote control system of the fourth embodiment. In FIG. 8, numerals 701 to 704 denote controlled unit A to D and numeral 705 denotes a transmission/reception unit for exchanging signals with a remote manipulation unit 706 and the computer 107.

In the first, second and third embodiments, the remote control system uses the dedicated remote manipulation units as the controlled units. The controlled units A to D in the fourth embodiment merely transmit to and receive from the computer 107 through the data transmission/reception unit 204 and the remote manipulation unit 706 transmits to and receives from the computer 107 through the transmission/reception unit 705. Accordingly, the control signals sent from the remote manipulation unit 706 are interpreted by the computer 107.

In this manner, in the present embodiment, it is not necessary to use the remote manipulation unit dedicated to the controlled unit, and whether any remote manipulation unit is used or the remote manipulation unit attached to the controlled unit is used, all manipulation units may be controlled by assigning a relation between the control signal from the remote control unit and the control command.

Further, not all of the signal transmission/reception unit 208 for transmission and reception to and from the remote manipulation unit and the signal receiver 202 need not be provided and the transmission/reception unit 705 which consolidates the functions of the signal transmission unit 208 and the signal reception unit 202 may be used so that the configuration of the remote control system may be simplified.

Accordingly, the communication of the control signals and the information with the remote manipulation unit 706 may be collectively conducted by the transmission/reception unit 705, the control signal from the transmission/reception unit 705 may be interpreted by the computer as the control command and the computer 107 may use the control command to operate the controlled units A to D.

In this manner, since all what can be controlled by the computer 107 may be incorporated in the remote control system as the remote manipulation unit, the expandability of the system is enhanced. Further, since all of the controlled units may be controlled if there is at least one remote manipulation unit even if the number of controlled units increases, the space saving is attained.

While four controlled units are provided in the present embodiment, the number is not restrictive.

In the determination of the priority in the step S502 of FIG. 5 of the embodiment of the present invention, a predetermined priority table determined by the ID codes may be used or a predetermined priority table determined by control codes may be used.

In a television conference system, where a command relating to the camera control such as a command to change the orientation of the camera and a command relating to other communication control are included as the control command, the command relating to the communication control such as a command to terminate the communication may be prioritized over the command relating to the camera control, because the command relating to the communication control should be processed more rapidly than the command relating to the camera control.

In accordance with the remote control system of the present embodiment, when the controlled unit connected to the main control unit is controlled by the remote manipulation unit, the remote manipulation unit receives the transmission permission signal from the main control unit by the transmission permission signal receiving means and sends the control signal to the control signal transmission means in accordance with the received transmission permission signal, and the main control unit transmits the transmission permission signal to the remote manipulation unit by the transmission permission signal transmission means, manages the operating status of the controlled unit by the operation status managing means and controls the controlled unit by the control means in accordance with the managed operation status and the control signal. Thus, the bidirectional communication is conducted by the remote manipulation unit and the main control unit and the problem relating to the use of the more than one remote manipulation units is solved. Namely, when more than one remote manipulation units are used, the problem that the control signals from the remote manipulation units are mixed and the desired control of the operator is not attained, or the manipulation is impeded by other manipulation during the manipulation is solved.

Even when the controlled unit is manipulated by using the remote manipulation unit, there is no discrepancy to the manipulation by the main control unit because the operation status of the controlled unit is managed by the main control unit.

In this manner, by consolidating the two independent control channels of the remote manipulation unit and the main control unit into one, the overall system can be managed by the main control unit and the problem by the use of more than one remote manipulation units is solved and a more efficient remote control system may be attained.

In accordance with the remote control system of the embodiment, the controlled unit receives the control signal from the remote manipulation unit by the control signal receiving unit, and the main control unit reads the control signal through the controlled unit by the control signal read means. Thus, the configuration of the conventional remote control system may be used as it is and the function may be enhanced.

In accordance with the remote control system of the embodiment, the remote manipulation unit determines the transmission permission signal by the determination means, stores the control signal by the control signal storing means, sets the identification code by the identification code setting means, stores the identification code set by the identification code storing means and adds the stored identification code to the control signal by the adding means. Thus, the operation of the remote control by the remote manipulation unit is enhanced by using the identification code.

In accordance with the remote control system of the embodiment, the main control unit displays the operation status of the controlled unit by the display means. Thus, the operator may readily grasp the operation status.

In accordance with the remote control system of the embodiment, the main control unit determines whether the reception error has occurred in the control signal or not by the determination means and informs the occurrence of the reception error to the remote manipulation unit by the informing means. Thus, the operator may confirm the transmission error in the control signal from the remote manipulation unit and secure the transmission of the control signal by the retransmission.

In accordance with the remote control system of the embodiment, the main control unit transmits various information including the operation status of the controlled unit by the information transmitting means, and the remote manipulation unit converts the received information to the character information by the character generation means and displays the character information by the character information display means. Thus, the operator may readily grasp various information including the operation status of the controlled unit from the character information displayed in the remote manipulation unit.

In accordance with the remote control system of the embodiment, the main control unit determines whether to accept the control signal from the remote manipulation unit in accordance with the identification signal by the identification code determining means and determines whether to control the controlled unit or not based on the accepted control signal in accordance with the priority determined by the identification code by the priority determination means. Thus, one of the plurality of remote manipulation units may be determined by using the identification code and the more effective remote control is attained by assigning the priority.

In accordance with the remote control system of the embodiment, the remote manipulation unit receives the transmission permission signal from the main control unit and transmits the control signal in accordance with the received transmission permission signal, and the main control unit transmits the transmission permission signal to the remote manipulation unit, manages the operation status of the controlled unit and controls the controlled unit in accordance with the managed operation status and the control signal. Thus, when more than one remote manipulation units are used within the effective range, the problem that the desired control of the operator is not attained or the manipulation is impeded by other manipulation during the manipulation is solved.

What is claimed is:

1. A remote control system comprising:
    a remote control device; and a plurality of receiving devices, wherein
        said remote control device generates control commands each of which controls one of said receiving devices,
        said receiving devices receive the control commands from said remote control device and operate in accordance with the control commands,
        at least one of said receiving devices includes a member to be physically moved in accordance with the control command,
        and at least one of said receiving devices includes means for arbitrating the control commands that are generated by said remote control device to arbitrate a response delay time from the reception of the control command to the start of the physical movement of the member, said arbitrating means for arbitrating the control command with a predetermined order of priority.

2. A remote control system according to claim 1, wherein said arbitration means holds the control command given during the response delay time.

3. A remote control system according to claim 1, wherein said receiving device includes conversion means for converting an object image to an electrical signal and communication means for communicating the electrical signal converted by said conversion means.

4. A remote control system according to claim 3, wherein said conversion means converts to an electrical signal representing an animation signal.

5. A remote control system according to claim 1, wherein said arbitration means causes said receiving device to operate in accordance with the commands in a sequence in accordance with priorities of the control commands.

6. A remote control system according to claim 1, wherein said arbitration means controls said remote control devices such that the occurrence of a plurality of control commands from said remote control devices is prevented.

7. A remote control system according to claim 6, wherein said control means outputs a signal permitting the generation of the control command to each of said remote control devices.

8. A receiving apparatus which is utilized together with a plurality of remote control devices that generate control commands, said apparatus comprising:
    receiving means for receiving the control commands, the receiving means having a member to be physically moved in accordance with at least one of the control commands;
    means for executing an operation in accordance with at least one of the control commands received by said receiving means; and
    means for arbitrating the control commands received from said remote control devices to arbitrate a response delay time from the reception of the at least one of the control commands to the start of the physical movement of the member, said arbitrating means for arbitrating the control commands with a predetermined order of priority,
    wherein said arbitrating means arbitrates the control commands so as to accept a control command from a remote control device having a higher priority and not to accept a control command from a remote control device having a lower priority.

9. A receiving device according to claim 8, wherein said arbitration means holds the control command given during the response delay time.

10. A receiving device according to claim 8, further comprising conversion means for converting an object image to an electrical signal and communication means for communicating the electrical signal converted by said conversion means.

11. A receiving device according to claim 10, wherein said conversion means converts to an electrical signal representing an animation.

12. A receiving device according to claim 8, wherein said arbitration means causes said receiving device to operate in accordance with the commands in a sequence in accordance with priorities of the control commands.

13. A receiving device according to claim 8, wherein said arbitration means controls said remote control devices such that the occurrence of a plurality of control commands from said remote control devices is prevented.

14. A receiving device according to claim 13, wherein said control means outputs a signal permitting the generation of the control command to each of said remote control devices.

15. A remote operating system comprising:
   a remote operating device;
   a main control device; and
   a plurality of controlled devices connected to the main control device and controlled by said remote operating device,
   wherein said remote operating device includes memory means for storing a control signal and an identification code, transmission permission signal receiving means for receiving a transmission permission signal from said main control device and control signal transmission means for transmitting the control signal together with the identification code stored in said memory means in accordance with the received transmission permission signal, and
   said main control device includes transmission permission signal transmitting means for transmitting the transmission permission signal to said remote operating device, operation status managing means for managing an operation status of said controlled devices and control means for controlling said controlled devices on the basis of the managed operation status, the control signal and the identification code.

16. A system according to claim 15, wherein said controlled device includes control signal receiving means for receiving the control signal from said remote operating device; and
   wherein said main control device includes control signal reading means for reading the control signal through said controlled device.

17. A system according to claim 15, wherein said remote operating device includes determining means for determining the transmission permission signal, control signal storing means for storing the control signal, identification code setting means for setting an identification code, identification code storing means for storing the set identification code and adding means for adding the stored identification code to the control signal.

18. A system according to claim 17, wherein said main control device includes identification code discriminating means for discriminating whether the control signal from said remote operating device is to be accepted or not on the basis of the identification code and prioritizing means for prioritizing whether to control said controlled device or not in accordance with the received control signal, in accordance with the identification code.

19. A system according to claim 15, wherein said main control device includes display means for displaying the operation status of said controlled device.

20. A system according to claim 15, wherein said main control device includes determining means for determining whether a reception error has occurred in the control signal or not and informing means for informing the occurrence of the reception error to said remote operating device.

21. A system according to claim 15, wherein said main control device includes information transmitting means for transmitting information including the operation status of said controlled device to said remote operating device; and
   said remote operating device includes conversion means for converting the received information to visual information and display means for displaying the converted visual information.

22. A method for operating, using a remote operating device, a controlled device connected to a main control device, the method comprising the steps of:
   storing a control signal and an identification code in a memory of the remote operating device,
   receiving, using the remote operating device, a transmission permission signal from the main control device;
   transmitting, from the remote operating device to the main control device, the control signal and the identification code stored in the memory in accordance with the received transmission permission signal;
   transmitting, from the main control device to the remote operating device, the transmission permission signal;
   managing an operation status of the controlled device; and
   controlling the controlled device on the basis of the managed operation status, the control signal and the identification code.

23. A remote control system comprising:
   a plurality of remote control devices each generating a control command and transmitting the control command to which an identification code specifying one of said plurality of remote control devices is added;
   a receiving device for receiving the control commands and the identification codes from said remote control devices and operating in accordance with the control commands; and
   a main control device for arbitrating the control commands received by said receiving device on the basis of the received identification codes.

24. A controlled apparatus connected to a main control device, which is utilized together with a plurality of remote control devices each transmitting a control command together with an identification code specifying one of the plurality of remote control devices, comprising:
   transmission permission signal transmitting means for transmitting a transmission permission signal to allow a remote control device having a specific identification code to transmit the control command;
   receiving means for receiving the control command from the remote control device having the specific identification code which received the transmission permission signal;
   means for interpreting the control command received by said receiving means; and means for executing an operation in accordance with the control command interpreted by said interpreting means.

25. A remote control apparatus for controlling a plurality of controlled devices, comprising:

input means for inputting a control command and an identification code specifying said remote control apparatus;

storing means for storing the input control command and the identification code;

receiving means for receiving a transmission permission signal from each of said controlled devices; and transmission means for transmitting the control command together with the identification code stored in said storing means to said controlled device which transmitted the transmission permission signal in accordance with the received transmission permission signal.

26. A remote control apparatus for controlling a plurality of controlled devices connected to a main control device, comprising:

input means for inputting a control command and an identification code specifying said remote control apparatus;

storing means for storing the input control command and the identification code;

receiving means for receiving a transmission permission signal from said main control device; and transmission means for transmitting the control command together with the identification code stored in said storing means to said main control device in accordance with the received transmission permission signal.

27. A remote control system comprising:

a plurality of wireless remote control devices; and plural kinds of controlled devices, wherein each of said plurality of remote control devices generates wireless control commands, each of which controls one of the plural kinds of controlled devices, each of said controlled devices receives the control commands from said remote control devices and operates in accordance with the received control commands, said plurality of controlled devices arbitrate the control commands by sending an arbitration command to at least some of said plurality of wireless remote control devices, and said at least some of said plurality of wireless remote control devices receive the arbitration command and refrain from generating control commands in response to the arbitration command.

28. A remote control system comprising:

a wireless remote control device; and plural kinds of controlled devices, wherein said remote control device generates wireless control commands, each of which controls one of the plural kinds of controlled devices, and each of said controlled devices receives the control commands from said remote control device and operates in accordance with the received control commands, at least one of said controlled devices arbitrates the control commands that are generated by said first remote control device by sending an arbitration command to the remote control device, and said wireless remote control device receives the arbitration command and refrains from generating certain control commands in response to the arbitration command.

* * * * *

UNITED STATES PATENT AND TRADEMARK OFFICE
CERTIFICATE OF CORRECTION

PATENT NO. : 6,107,937

DATED : August 22, 2000

INVENTOR(S): TETSUYA HAMADA

It is certified that error appears in the above-identified patent and that said Letters Patent is hereby corrected as shown below:

COLUMN 1:
Line 61, "prevent)" should read --prevent--.

COLUMN 2:
Line 13, "other" should read --another--;
Line 15, "other" should read --another--; and
Line 18, "other" should read --another--.

COLUMN 7:
Line 64, "not" should be deleted.

Signed and Sealed this

Twenty-ninth Day of May, 2001

Attest:

NICHOLAS P. GODICI

Attesting Officer     Acting Director of the United States Patent and Trademark Office